Patented Mar. 7, 1944

2,343,432

UNITED STATES PATENT OFFICE 2,343,432

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,123

25 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oils of internal combustion engines the dirt removal rate of filtering media can be sharply increased by contacting the oil to be filtered by the filtering media with a product of esterification reaction falling within the general classification of esterification products which are derivable by reaction between a polybasic carboxylic acid and a hydroxylated detergent-forming carboxylic body involving replacement of an alcoholiform hydroxyl of the hydroxylated detergent-forming carboxylic body with the residue of the polybasic carboxylic acid and which products do not contain a residue of a polyhydric alcohol. The ester product may be added to the filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having high dirt removal rate.

Polybasic carboxy acids which may be employed in the esterification reaction may be exemplified by phthalic, succinic, malic, fumaric, citric citriconic, maleic, adipic, tartaric, oxalic or the like. The anhydrides of such polybasic carboxy acids such as phthalic anhydride, maleic anhydride, etc., are the equivalents of the acids and in some respects are even more advantageous than the acids in the production of esters. When reference is made to polybasic carboxy acids the anhydrides thereof are also included. Other suitable polybasic acids may be prepared by the diene synthesis, which involves condensation of alpha, beta unsaturated acids or anhydrides with compounds containing a conjugated double bond. For example, the condensation of maleic anhydride with alpha terpinene yields a dicarboxy acid which is suitable. Other polybasic carboxy acids may be prepared similarly by the diene synthesis involving condensation of an alpha, beta unsaturated monocarboxy acid with a carboxy acid containing a conjugated double bond. For example crotonic acid may be condensed with abietic acid, which contains a conjugated double bond, to yield a dicarboxy acid suitable for use in the manufacture of ester products in increasing the rate of dirt removal from lubricating oils in a filtering operation. Functional equivalents of polybasic carboxy acids, such as chlorphthalic acid, may be employed.

Detergent-forming monobasic carboxy acids are those acids having at least 8 carbon atoms which have the capacity to react with alkali to form soap or soap-like products. The terms hydroxylated detergent-forming acids or hydroxy detergent-forming acids refer to those detergent-forming acids which contain in the acyl radical thereof an hydroxyl or the equivalent. The most common type of hydroxylated detergent-forming monobasic carboxy acids are hydroxylated fatty acids containing 8 to 32 carbon atoms such as ricinoleic acid, mono- and di-hydroxy stearic acid, trihydroxy palmitic acid, etc. Preferably the ester products that are used to increase the dirt removal rate of filtering media in the practice of this invention are derived from hydroxylated fatty acids having 8 to 32 carbon atoms. In addition to fatty acids there are naphthenic acids and those mono-carboxy acids that are sometimes called wax acids or paraffin acids, and that are formed as the result of mild oxidation of paraffin or petroleum waxes, particularly those derived from a paraffin base petroleums, which occur in hydroxylated condition and may be employed. Such acids usually vary from 10 to 38 carbon atoms.

While the terms detergent-forming mono-carboxy acid and hydroxylated detergent-forming mono-carboxy acid include oxidized acids as well as acids in their naturally occurring state, those fatty bodies which are drastically oxidized have distinctive properties and characteristics and certain ester products containing such drastically oxidized bodies are claimed in our application Serial No. 381,119 filed February 28, 1941, for Filters.

A simple ester of the type referred to is that formed by reaction between phthalic anhydride and ricinoleic acid, the phthalic acid residue replacing the alcoholiform hydroxyl of the ricinoleic acid. The reaction may be indicated as follows:

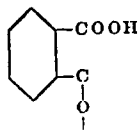

In the foregoing and in subsequent formulae a conventional showing in two dimensional form is resorted to, and no attempt other than this is made to indicate actual space molecular formulae. Moreover, distinctions between isomeric forms are to be disregarded.

Another simple ester of similar type may be produced by reacting hydroxy stearic acid with phthalic acid, the reaction being as follows:

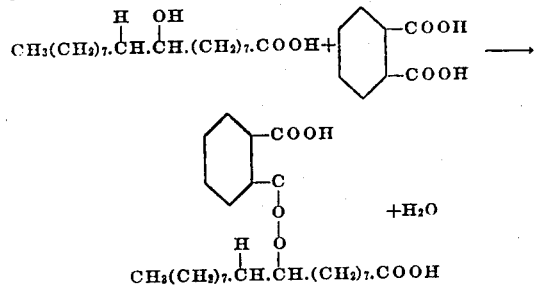

In the foregoing reaction water is split off and the reaction may be hastened by the presence of conventional materials of the type of dry $CO_2$ or nitrogen or the like which carries off the water. When the anhydride is used, as in the first example above given, no water is split off and the reaction proceeds more readily since it is not necessary to remove water as a reaction product. In either case the reaction may be caused to occur by intimately mixing the reacting materials and heating them to approximately the melting point of the phthalic acid (or anhydride). If desired some inert diluent or solvent such as xylene may be present.

In addition to reacting a polybasic carboxy acid with an hydroxylated detergent-forming carboxylic body containing an acid hydrogen in the carboxylic group, the hydroxylated carboxylic body may be in the form of a metal salt or an ester of a monohydric alcohol. Thus in the foregoing examples the hydroxylated fatty acid body might be in the form of a ricinoleate or a hydroxy stearate of sodium, potassium, iron, calcium or the like. Alternatively hydroxylated fatty acid esters of monohydric alcohols could be used, e. g. aliphatic alcohols such as methyl, ethyl, propyl, hexyl, octyl, decyl, cetyl, ceryl, etc.; alicyclic alcohols such as cyclohexanol and the like, or aralkyl alcohols such as benzyl alcohol, naphthyl ethyl alcohol, and the like. Similarly, hydroxylated fatty acid esters of monohydric alcohol ethers may be used such as those derived by reacting any of the foregoing alcohols with an alkylene oxide such as ethylene oxide, propylene oxide, butylene oxide, or the like (but excluding compounds such as glycide or the like), typical ether alcohols of the kind mentioned being illustrated by the following formulae:

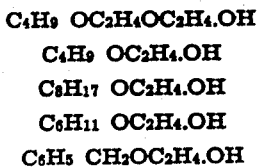

In each of the foregoing the residue to which the free hydroxyl is attached is regarded as a unitary radical of a monohydric alcohol. By reacting hydroxy aromatic compounds such as phenol, naphthol, and the like with an alkylene oxide, such compounds can be converted to mono-hydroxy aralkyl alcohol ethers which are suitable, and such compounds together with the alphyl, alicyclic and aralkyl alcohols and alcohol ethers are regarded as comprising an alkyl group as the term "alkyl" is used herein. As aforesaid, aryl groups other than aralkyl groups are not regarded as included in the term "alkyl."

Other examples of suitable hydroxy fatty acids or their functional equivalents which are adapted to react through the alcoholiform hydroxyl with polybasic carboxy acids or their anhydrides are trihydroxy palmitic acid, butoxy ethyl ricinoleate, ethyl dihydroxy stearate, etc.

When one mole of a polybasic carboxy acid reacts with one mole of a mono-hydroxylated fatty body for example, the polybasic carboxy acid residue which replaces the alcoholiform hydroxyl of the fatty body will contain one free carboxyl group. When reference is made to a carboxyl group the group COOH containing the acid hydrogen is intended. When reference is made to a carboxylic group the group may contain the acid hydrogen or another hydrogen equivalent such as a metal or an alkyl radical derived from a monohydric alcohol, and polybasic carboxylic acid residues containing such carboxylic groups may be present in ester products that may be used to increase the dirt removal rate of filtering media according to this invention. Similarly the carboxyl group can be converted into an ammonium salt, or a substituted ammonium salt, by use of ammonia, or an amine, or an hydroxylated amine. When a monohydric hydroxylated amine is used the acidic hydrogen of the carboxyl group may be replaced by esterification involving the alcoholic hydroxyl or by simple neutralization. Examples of suitable amines or amino-alcohols are amyl amine, cyclohexyl amine, ethanol amine, aminomethyl propanol, etc. Mono-hydroxy amino-alcohols functioning as an alcohol are the equivalent of an ordinary monohydric alcohol such as ethyl, amyl, propyl, etc. alcohols. It is apparent, however, that if there are a plurality of alcoholiform hydroxyls or the equivalent available in the hydroxylated fatty body, e. g., in the case of dihydroxy stearic acid or trihydroxy palmitic acid, all of the carboxyl radicals of the polybasic carboxy acid may react with alcoholiform hydroxyls of the fatty acid body. Moreover, a free carboxyl group of a polybasic carboxy acid residue contained in the ester product may be esterified by reaction with additional hydroxylated fatty acid or even with an hydroxylated non-fatty carboxylic acid such as lactic acid and such polybasic carboxylic acid residues may be present in suitable ester products either in acid form or in the form of metal salts or alkyl esters of monohydric alcohols. Whether the acid hydrogen of a carboxyl of a polybasic carboxy acid is present or has been replaced in the ways above mentioned, the resulting product is regarded as a product of esterification reaction between a polybasic carboxy acid and an hydroxylated fatty body.

In the case of poly-hydroxylated fatty bodies, if desired only one of the hydroxyls of the fatty body may be replaced by a polybasic carboxy acid residue, leaving a free hydroxyl in the fatty group. Any such free hydroxyl in the fatty group may be left as it is or may be acylated with additional polybasic carboxy acid or with a monocarboxy acid having either less than, or more than, 8 carbon atoms. The ester products contemplated herein do not, however, contain any free hydroxyl other than a hydroxyl contained in a fatty group or corresponding group of some other detergent-forming carboxylic acid body.

While reference has been made to hydroxylated fatty acids and other hydroxylated detergent-forming carboxylic bodies, it is apparent that simple modifications of such compounds are the functional equivalents. For example, chlorinated ricinoleic acid may be employed instead of ricinoleic acid. In such instances the hydroxylated material, notwithstanding modifications of the kind indicated, still has the same functional properties as the unmodified material and thus acts in the same manner as far as esterification reactions of the character herein described are concerned. It is also possible, for example, to condense two moles of ricinoleic acid and produce one mole of monobasic diricinoleic acid. Likewise monobasic triricinoleic acid and monobasic tetraricinoleic acid may be used. Furthermore it is also possible that the carboxyl group of an hydroxylated fatty acid, for example, may condense with the alcoholiform hydroxyl of some other hydroxylated detergent-forming carboxylic body or even with the alcoholiform hydroxyl of some non-detergent-forming carboxy acid such as lactic acid. Such modifications of hydroxylated fatty acids, etc., their metal salts and their alkyl esters of mono-hydric alcohols are regarded as suitable hydroxylated detergent-forming carboxylic bodies.

In order to illustrate somewhat more specifically the composition of ester products which may be used to increase the dirt removal rate of filtering media in the practice of this invention, most of such esterification products are represented by the following formula,

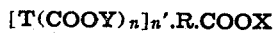

[T(COOY)$_n$]$_{n'}$.R.COOX wherein R represents an oxy residue of an hydroxylated detergent-forming mono-carboxy acid having at least 8 carbon atoms; COOX represents a carboxylic group wherein X is an acid hydrogen, a metal, ammonium, substituted ammonium, or an alkyl radical derived from a monohydric alcohol; $n'$ is 1, 2 or 3; and [T(COOY)$_n$] represents a polybasic carboxy residue in which $n$ is 2 or 3, in which residue (COOY) is a carboxylic radical wherein Y is an acid hydrogen, a metal, ammonium, substituted ammonium, or an alkyl radical derived from a mono-hydric alcohol or is supplied by a carbon atom of R, which residue is attached to R by at least one of said carboxylic radicals wherein Y is supplied by a carbon atom of R, and in which residue T is the balance of said polybasic carboxy acid residue.

Some of the ester products above defined are somewhat soluble in oil while others are substantially insoluble. If the ester product is such that only one part or less is soluble (as determined by usual visual methods) in one thousand parts of ordinary straight-run kerosene from Pennsylvania crude, the product is to be regarded as substantially insoluble in oil. For use in increasing the dirt removal rate of filtering media according to this invention it is preferable that the ester product be substantially insoluble in oil. Most of the ester products hereinabove described are sub-resinous in character and of a tarry or balsam-like consistency. Absolute insolubility in oil is not desirable. However, even a trace of solubility such as a few parts dissolving in one hundred thousand parts of kerosene of the character above mentioned affords a satisfactory product for increasing the filtering rate of filtering media in the practice of this invention.

The production of preferred ester products which are substantially oil-insoluble or of low oil solubility can readily be achieved having in mind the following factors which influence oil solubility of the ester product. Thus oil solubility is decreased when the polybasic carboxy acid employed in the esterification reaction has a relatively low number of carbon atoms. For example, a product made using phthalic acid will have less oil solubility than a product derived by reaction with naphthalic acid, and a product made using citric or maleic acid will have less oil solubility than a product derived by reaction with phthalic acid. However, for most purposes a single ring polybasic aromatic acid and particularly a dibasic aromatic acid such as phthalic acid is to be preferred. Oil solubility is also affected by the nature of any substituent for the acid hydrogen of a residual carboxyl group in the ester product. Thus the ester product wherein the acid hydrogen is retained has less solubility in oil than a product wherein the acid hydrogen is replaced by an alkyl hydrocarbon. For this reason ester products containing an acid carboxylic group are among preferred ester products for use in the practice of this invention. Moreover, from the standpoint of effectiveness in increasing the dirt removal rate of filtering media, it is preferable to have at least one free carboxyl group in the ester product and it is preferable that a free carboxyl group be contained in a polybasic carboxylic acid radical. If the acid hydrogen of a carboxylic group is replaced by an oxy-alkyl group wherein the carbon atoms are separated by at least one oxygen atom, e. g. contains an alkylene oxy group, the oil solubility will be decreased as compared with a product wherein the acid hydrogen of the carboxylic group is replaced by an hydrocarbon alkyl group and such compounds containing an oxy-alkyl group are among preferred products for use according to this invention. Oil solubility can also be decreased by selecting an hydroxylated fatty body that has a relatively low number of carbon atoms. While there are other factors affecting oil solubility, the foregoing discussion is believed to be adequate to enable one to obtain ester products having desired properties of oil solubility. While it is preferable to employ ester products which are substantially insoluble in oil as defined above, those ester products which are more soluble in oil may likewise be employed.

Generally speaking, ester products hereinabove described are substantially water insoluble, namely, are not more soluble than 1 part in 1000 parts of water at 50–80° F. Water insolubility is not particularly important, however, because water in more than very small amounts does not occur in the oil which is used in the lubricating system of an internal combustion engine and which is clarified by the use of a filter. The ester products that are used to increase the dirt removal rate of filtering media in the practice of this invention preferably are totally or substantially water insoluble.

In the preparation of esterification products adapted for use in increasing the rate of dirt removal of filtering media used in a filtering operation, the esterification reaction may be caused to take place readily upon application of heat, the reaction being the more rapid the higher the temperature that is employed, but care should be exercised not to employ excessively high temperatures which would cause decomposition. The reaction may, if desired, be in the presence of an inert solvent, such as xylene, which may be removed after the completion of the reaction. When a solvent such as xylene is used during an esterification reaction wherein water is formed, the reaction may be conducted under a reflux condenser using a water trap so as to remove the water. The reaction can also be hastened by passing through the mixture a dried inert gas such as $CO_2$ or nitrogen. Generally speaking the reaction takes place readily by simply heating substances to enter into the reaction in desired stoichiometric proportions at a temperature above the boiling point of water, usually between about 110° to 160° C. provided there is no decomposition.

During the esterification reaction involving the hydroxylated acids there may be some polymerization, especially if the conditions of esterification are prolonged. This polymerization is due primarily to formation of more complicated compounds from monomeric forms through formation of ester linkages with loss of water. It is to be understood that reference to ester products of the character herein referred to includes possible polymerized forms as well as simple esters or monomers.

The following are specific examples of the preparation of preferred ester products for use in increasing the dirt removal rate of filtering media according to this invention.

Example 1

One pound mole of ethyl ricinoleate is reacted with one pound mole of phthalic anhydride to produce a fractional ester, i. e., the acid phthalate of ethyl ricinoleate.

Example 2

Maleic anhydride is substituted for phthalic anhydride in the preceding example to produce the acid maleate of the ethyl ricinoleate.

Example 3

Adipic acid is substituted for phthalic anhydride in Example 1 preceding in order to obtain the acid adipate of ethyl ricinoleate.

Example 4

Succinic acid or anhydride is substituted for phthalic anhydride in Example 1 preceding in order to obtain the acid succinate of ethyl ricinoleate.

Example 5

Butyl ricinoleate is substituted for ethyl ricinoleate in Examples 1 to 4 preceding.

The products produced as above described which are suitable for increasing the dirt removal rate of filtering media are soluble in one or more of such solvents as lower aliphatic alcohols (ethyl to octyl), carbon tetra chloride, xylene, toluene, etc. This facilitates application of the ester products to filters and to filtering media. Preferably, as aforesaid, the product is prepared so as to be substantially insoluble, or of low solubility, in oil.

The esterification product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes a small amount, such as 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in conjunction with a filter, a single filter can be made which can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter, and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising an esterification product which is produced by reaction between a polybasic carboxylic acid and an hydroxylated detergent-forming carboxylic body having more than 8 carbon atoms involving replacement of an alcoholiform hydroxyl of the hydroxylated body with the residue of said polybasic carboxylic acid and which does not contain a residue of a polyhydric alcohol.

2. A filter according to claim 1 wherein said hydroxylated detergent-forming carboxylic body is an hydroxylated fatty body having 8 to 32 carbon atoms.

3. A filter according to claim 1 wherein said product of esterification contains a free carboxyl group.

4. A filter according to claim 1 wherein said product of esterification contains an alkyl group derived from a mono-hydric ether alcohol.

5. A filter according to claim 1 wherein said esterification product is one that is produced by reaction between an hydroxylated fatty body having 8 to 32 carbon atoms and an aromatic dibasic carboxy acid.

6. A filter according to claim 1 wherein said esterification product is one that is produced by reaction between a ricinoleic body and a polybasic carboxy acid and contains a free carboxyl in the polybasic carboxy acid residue.

7. A filter according to claim 1 wherein said esterification product contains an acyl-oxy radical derived from ricinoleic acid and a polybasic carboxy acid radical derived from phthalic acid and said product includes a free carboxyl group.

8. A filter according to claim 1 wherein said esterification product contains an acyl-oxy radical derived from ricinoleic acid and a polybasic carboxy acid radical derived from maleic acid and said product includes a free carboxyl group.

9. A filter according to claim 1 wherein said esterification product contains an acyl-oxy radical derived from ricinoleic acid and a polybasic carboxy acid radical derived from adipic acid and said product includes a free carboxyl group.

10. A filter according to claim 1 wherein said product of esterification is substantially insoluble in oil.

11. A filter according to claim 1 wherein said product of esterification is substantially insoluble in oil and is substantially insoluble in water.

12. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising an esterification product represented by the formula

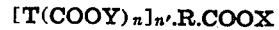

$$[T(COOY)_n]_{n'}\cdot R\cdot COOX$$

wherein R represents an oxy residue of an hydroxylated detergent-forming carboxylic body having at least 8 carbon atoms; COOX represents a carboxylic group in which X is an acid hydrogen, a metal, ammonium, substituted ammonium, or an alkyl radical derived from a monohydric alcohol; $n'$ is 1, 2 or 3; and $[T(COOY)_n]$ represents a polybasic carboxylic acid residue in which residue $n$ is 2 or 3, in which residue (COOY) is a carboxylic radical wherein Y is an acid hydrogen, a metal, ammonium, substituted ammonium, an alkyl radical derived from a monohydric alcohol or is supplied by a carbon atom of R, which residue is attached to R by at least one of said carboxylic radicals wherein Y is supplied by a carbon atom of R, and in which residue T is the balance of said polybasic carboxy acid residue.

13. A filter for use in connection with the lubricating system of an internal combustion engine, said filter comprising a casing containing a filtering medium which is sufficiently porous to permit oil to flow therethrough but sufficiently compact to filter out solid particles, said medium having applied thereto as an agent to increase the dirt removal rate of said filtering medium an esterification product which is produced by reaction between a polybasic carboxylic acid and an hydroxylated fatty acid body having 8 to 32 carbon atoms involving replacement of an alcoholiform hydroxyl of the hydroxylated fatty body with the residue of said polybasic carboxy acid and which does not contain a residue of a polyhydric alcohol.

14. A method of increasing the dirt removal rate of a filtering medium for removing dirt from the lubricating oil of an internal combustion engine, said method comprising contacting oil that is filtered by said filtering medium with an esterification product which is produced by reaction between a polybasic carboxylic acid and an hydroxylated detergent-forming carboxylic body having at least 8 carbon atoms involving replacement of an alcoholiform hydroxyl of the hydroxylated body with the residue of said polybasic acid and that does not contain a residue of a polyhydric alcohol.

15. A method according to claim 14 wherein said hydroxylated detergent-forming carboxylic body is an hydroxylated fatty body having 8 to 32 carbon atoms.

16. A method according to claim 14 wherein said product of esterification contains a free carboxyl group.

17. A method according to claim 14 wherein said product of esterification contains an alkyl group derived from a monohydric ether alcohol.

18. A method according to claim 14 wherein said esterification product is one that is produced by reaction between an hydroxylated fatty body having 8 to 32 carbon atoms and an aromatic dibasic carboxy acid.

19. A method according to claim 14 wherein said esterification product is one that is produced by reaction between a ricinoleic body and a polybasic carboxy acid and contains a free carboxyl in a polybasic carboxy acid residue.

20. A method according to claim 14 wherein said esterification product contains an acyl-oxy radical derived from ricinoleic acid and a polybasic carboxy acid radical derived from phthalic acid and said product includes a free carboxyl group.

21. A method according to claim 14 wherein said esterification product contains an acyl-oxy radical derived from ricinoleic acid and a polybasic carboxy acid radical derived from maleic acid and said product includes a free carboxyl group.

22. A method according to claim 14 wherein said esterification product contains an acyl-oxy radical derived from ricinoleic acid and a polybasic carboxy acid radical derived from adipic acid and said product includes a free carboxyl group.

23. A method according to claim 14 wherein said product of esterification is substantially insoluble in oil.

24. A method according to claim 14 wherein said product of esterification is substantially insoluble in oil and is substantially insoluble in water.

25. A method of increasing the dirt removal rate of a filtering medium for removing dirt from the lubricating oil of an internal combustion engine, said method comprising contacting oil that is filtered by said filtering medium with an esterification product represented by the formula

wherein R represents an oxy residue of an hydroxylated detergent-forming carboxylic body having at least 8 carbon atoms; COOX represents a carboxylic group in which X is an acid hydrogen, a metal, ammonium, substituted ammonium, or an alkyl radical derived from a monohydric alcohol; $n'$ is 1, 2 or 3; and $[T(COOY)_n]$ represents a polybasic carboxylic acid residue in which residue $n$ is 2 or 3, in which residue (COOY) is a carboxylic radical wherein Y is an acid hydrogen, a metal, ammonium, substituted ammonium, an alkyl radical derived from a monohydric alcohol or is supplied by a carbon atom of R, which residue is attached to R by at least one of said carboxylic radicals wherein Y is supplied by a carbon atom of R, and in which residue T is the balance of said polybasic carboxy acid residue.

DONALD H. WELLS.
MELVIN DE GROOTE.